F. D. Ballou.

Boots & Shoes.

No. 3352. Reissued Mar. 30. 1869

Witnesses

Geo. B. Peyton

W. N. Walton

Inventor

Francis D. Ballou

By Baldwin & Son

Attys

UNITED STATES PATENT OFFICE.

FRANCIS D. BALLOU, OF ABINGTON, ASSIGNOR TO ALFRED B. ELY, OF NEWTON, MASSACHUSETTS.

IMPROVEMENT IN BOOTS AND SHOES.

Specification forming part of Letters Patent No. 18,614, dated July 4, 1865; Reissue No. 3,352, dated March 30, 1869.

*To all whom it may concern:*

Be it known that I, FRANCIS D. BALLOU, of of Abington, in the State of Massachusetts, have invented a new and useful Article of Boot and Shoe Manufacture, of which the following is a full description, in connection with the drawings.

Figure 1:
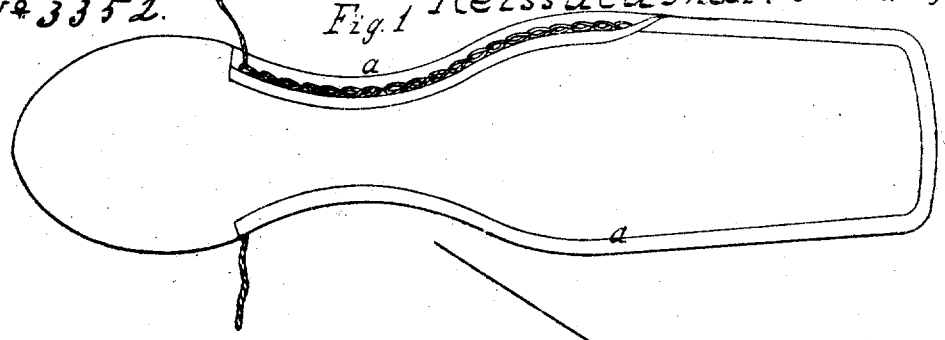
Figure 2:
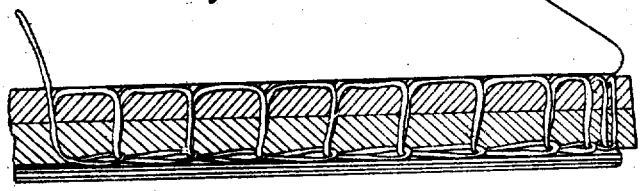
Figure 3:
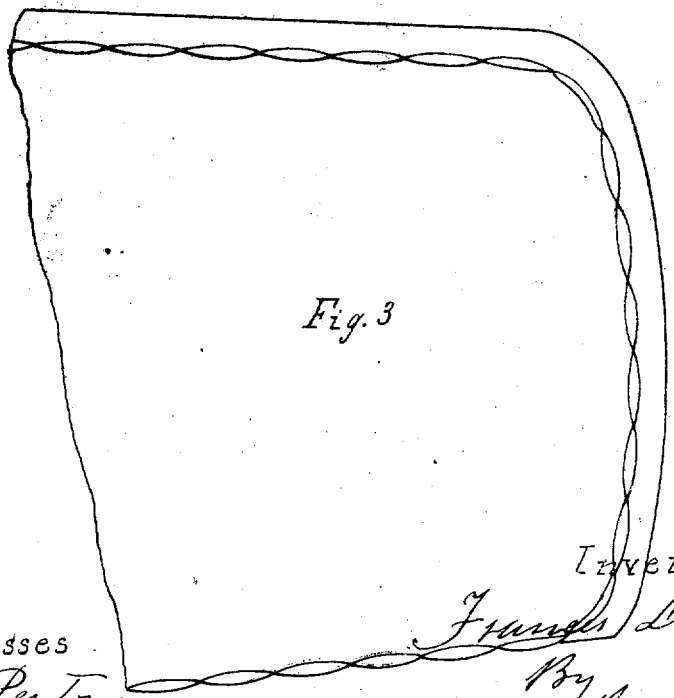

Figure 1 is a view of the sole of a channeled shoe, with a portion of the stitches exposed. Fig. 2 is an enlarged vertical section through the sole at the line of stitching. Fig. 3 is an enlarged view of the toe of the shoe.

Hand-sewed boots and shoes have been made from time immemorial by sewing the outer sole to a welt or half-sole attached to the upper; but boots and shoes, where the sole is attached by machinery, carrying a waxed thread, and placing the stitches entirely outside the uppers, have never been furnished as articles of manufacture prior to my invention. Nothing of this kind has ever been furnished to the trade or found in the market.

The object of my invention is to furnish a manufactured boot or shoe, as to which the sole is sewed to the welt, or outsole to half-sole through and through by what is known as "waxed-thread" sewing machinery, placing the stiching on the outside the uppers.

Letters Patent have been granted to me for attaching welts to uppers, &c., and for improvements in machinery for sewing boots and shoes, and I do not now claim any machinery.

When the boot or shoe is so far completed as to have its welt, or welt-sole, or the equivalent of either, properly attached to the upper and lasted, the outer is cut and placed upon it, and properly tacked in position. The boot or shoe (with the last removed or not) is then brought to the sewing-machine, and is so placed as to receive the concatenation of stitches all around the sole on the outside of the upper, but so close as to present a neat finish. When necessary, the outsole may be channeled, as shown in Fig. 1, *a*, but that may be dispensed with. I use a waxed-thread, and consequently a waxed-thread sewing-machine, which requires a barbed or hooked needle.

It is obvious that with machinery having suitable feeding and supporting mechanism I can place the stitches with perfect regularity in the seam, and that by proper guards between the sole and upper the piercing-instrument may be prevented from puncturing or injuring the upper leather. I can place the the stitch so that the face shall appear on either side of the work. In this way boots and shoes of the best styles of hand-work can be made with great economy—such, for example, as are called "Scotch bottoms."

What I claim as new and improved is—

The new article of manufacture, constituting a boot or shoe, made substantially in the manner described.

Witness my hand to the foregoing specification.

F. D. BALLOU.

Witnesses:

T. S. SMITH,

W. M. PARKER.